BEST AVAILABLE COPY

July 24, 1934. B. F. CONNER Re. 19,249

BOTTLE CAP

Original Filed Sept. 17, 1932

Inventor
Benjamin F. Conner
By S. Jay Teller
Attorney

UNITED STATES PATENT OFFICE 19,249

DESIGN FOR A BOTTLE CAP

Benjamin F. Conner, West Hartford, Conn., assignor to Colt's Patent Fire Arms Manufacturing Co., Hartford, Conn., a corporation of Connecticut Original No. 88,402, dated November 29, 1932, Serial No. 44,964, September 17, 1932, for 7 years. Application for reissue May 31, 1934, Serial No. 51,959. Term of patent 7 years

*To all whom it may concern:*

Be it known that I, BENJAMIN F. CONNER, a citizen of the United States, formerly residing in Wethersfield, in the county of Hartford and State of Connecticut, and now residing in West Hartford, in the said county and State, have invented a new, original, and ornamental Design for a Bottle Cap, of which the following is a specification, reference being had to the accompanying drawing.

Figure 1:
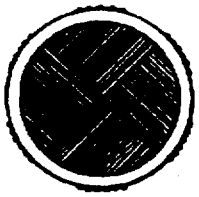
Fig. 1 is a plan view of a bottle cap embodying my new design.
Figure 2:
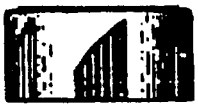
Fig. 2 is a side view.

The dominant feature of my design is the ornamentation appearing on the peripheral cylindrical surface and more partticularly shown in Fig. 2.

I claim:

The ornamental design for a bottle cap as shown and described.

BENJAMIN F. CONNER.